Patented Apr. 16, 1929.

1,709,309

UNITED STATES PATENT OFFICE.

ADOLF CORRELL, OF ESSEN-RUHR, GERMANY, ASSIGNOR TO ZECHE MATHIAS STINNES, OF ESSEN-RUHR, GERMANY.

PROCESS FOR THE SEPARATION OF LOW-TEMPERATURE TAR INTO PHENOLS AND HYDROCARBONS.

No Drawing. Application filed November 7, 1925, Serial No. 67,683, and in Germany December 10, 1924.

It has been proposed to separate low temperature tar (urteer) and its distillates into their constituents, phenols and hydrocarbons, by treating the tar or tar distillates with dilute alcohol and ammoniacal water.

Further investigations have shown, that much better results are obtained if the tar or tar distillates be treated with dilute alcohol, say of 56% and gaseous ammonia, by passing gaseous ammonia into the tar or tar distillates with alcohol until the mass is fully saturated. The heat of absorption should be removed by cooling. As a rule, a separation into two layers ensues after a short time when the upper layer contains neutral oils with little alcohol and ammonia, whereas the bottom layer contains the phenols in aqueous, alcoholic and ammoniacal solution. After separating the two layers, the liquors are heated separately, whereby the phenols and the neutral oils (hydrocarbons) are obtained in a pure state.

*Example.*

500 kilos of low temperature tar distillates of a boiling point between 180° to 250° C. consisting, as a rule of 32% phenols, 2% basic compounds and 66% neutral oils are mixed at ordinary temperatures with 600 parts (by volume) of 56% alcohol equal to 298 kilos of 100% alcohol, whereupon ammonia gas is passed into the mixture until it is thoroughly saturated. As a rule about 84 kilos $NH_3$ will be required. The heat of absorption is removed by cooling. After a short time of standing the mass separates into 2 layers, the bottom layer containing the phenols in aqueous, alcoholic and ammoniacal solution and the top layer the neutral oils with a small portion of alcohol and ammonia.

The liquors are allowed to run off separately from the separating vessel and are then worked up in the following manner. The phenolic solution is distilled and at a temperature of 90° to 95° C. the alcohol, ammonia and the portion of the water is driven off. Some portions of the phenols separate out, even while the mass is still warm and on cooling the rest of the phenols will separate. The phenols are then divided off and washed with some acidified water to remove basic substances. If phenols are required in perfect purity they are distilled once more.

The portion containing the neutral oils is treated in a similar manner. The liquors are heated for a short time up to 180° C. to free them from the small quantities of alcohol and ammonia, so that the neutral oils are left behind. They can be distilled, if perfect purity of the oils is desired.

It has been found, that in one operation 94% of the phenols present with a purity of 99% and 99% of the hydrocarbons with a percentage of 5% phenols can be obtained.

Of course, all the solvents, like ammonia and alcohol are fully recovered by condensation and used over again. The losses of recovery are very small, because the water remaining behind after the separation of the phenols is employed again for the next operation.

The process as described presents the following advantages.

1. The quantity of alcohol required compared with the old method is greatly diminished. Whereas according to the old process 180 to 200 parts of 100% alcohol were required for a definite quantity of tar distillate, only 59 parts of 100% alcohol are necessary for the same quantity of tar oils by the present process. The costs or recovery by distilling and the size of the distilling apparatus are correspondingly diminished.

2. The operation is finished in a very short time and the separation is as perfect as could be desired.

3. The products obtained are of great purity.

The process can be altered within certain limits without altering the scope of the invention and we therefore do not confine ourselves to the quantities or percentage of the liquors stated.

I claim as my invention:

A process for the separation of low temperature tar oils or tar distillates into phenols and neutral oils hydrocarbons, which consists in mixing the low temperature tar oils or tar distillates with dilute alcohol, passing ammonia gas into the thus obtained mixture while cooling until the mixture is saturated with ammonia, allowing to settle, whereby two layers are formed, the upper one consisting principally of neutral oils and the lower one containing the phenols and, separating these two layers.

In testimony whereof I affix my signature.

DOCTOR ADOLF CORRELL.